(12) United States Patent
Zheng et al.

(10) Patent No.: US 11,845,065 B2
(45) Date of Patent: *Dec. 19, 2023

(54) PALLADIUM FIXING AND LOW FRESH OXYGEN STORAGE CAPACITY USING TANNIC ACID AS A COMPLEXING AND REDUCING AGENT

(71) Applicant: Johnson Matthey Public Limited Company, London (GB)

(72) Inventors: Qinghe Zheng, Wayne, PA (US); Jing Lu, Wayne, PA (US); Michael Howard, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,918

(22) Filed: Jun. 8, 2022

(65) Prior Publication Data

US 2022/0401926 A1 Dec. 22, 2022

Related U.S. Application Data

(60) Provisional application No. 63/202,419, filed on Jun. 10, 2021.

(51) Int. Cl.
*B01J 21/04* (2006.01)
*B01J 21/06* (2006.01)
(Continued)

(52) U.S. Cl.
CPC ............ *B01J 23/44* (2013.01); *B01D 53/945* (2013.01); *B01J 21/04* (2013.01); *B01J 23/10* (2013.01);
(Continued)

(58) Field of Classification Search
CPC . B01J 21/04; B01J 21/066; B01J 23/10; B01J 23/44; B01J 23/63; B01J 35/0006;
(Continued)

(56) References Cited

U.S. PATENT DOCUMENTS 9,687,818 B2 6/2017 Siani
10,472,290 B2 * 11/2019 Goto .................. B01J 23/63
(Continued)

FOREIGN PATENT DOCUMENTS

CN 110215919 A 9/2019
WO 2007105052 A2 9/2007
(Continued)

OTHER PUBLICATIONS

Coccia, F.; Tonucci, L.; Bosco, D.; Bressan, M.; d'Alessandro, N. One-Pot Synthesis of Lignin -Stabilised Platinum and Palladium Nanoparticles and Their Catalytic Behaviour in Oxidation and Reduction Reactions. Green Chemistry 2012, 14 (4), 1073-1078.
(Continued)

*Primary Examiner* — Cam N. Nguyen

(57) ABSTRACT

A method of manufacturing a catalyst article, the method comprising: providing a complex of a polyphenol and a PGM, the polyphenol comprising an ester functional group, the PGM comprising palladium; providing a support material; applying the complex to the support material to form a loaded support material; disposing the loaded support material on a substrate; and heating the loaded support material to form nanoparticles of the PGM on the support material.

15 Claims, 5 Drawing Sheets

(51) Int. Cl.
*B01J 23/10* (2006.01)
*B01J 23/44* (2006.01)
*B01J 23/63* (2006.01)
*B01J 35/00* (2006.01)
*B01J 35/04* (2006.01)
*B01J 37/02* (2006.01)
*B01J 37/08* (2006.01)
*B01D 53/94* (2006.01)
*B01J 23/46* (2006.01)

(52) U.S. Cl.
CPC ......... *B01J 23/464* (2013.01); *B01J 35/0006* (2013.01); *B01J 35/0013* (2013.01); *B01J 35/04* (2013.01); *B01J 37/024* (2013.01); *B01J 37/0219* (2013.01); *B01J 37/0228* (2013.01); *B01J 37/0236* (2013.01); *B01J 37/086* (2013.01); *B01D 2255/1023* (2013.01); *B01D 2255/903* (2013.01); *B01D 2255/908* (2013.01)

(58) Field of Classification Search
CPC .... B01J 35/0013; B01J 35/04; B01J 37/0219; B01J 37/0228; B01J 37/0236; B01J 37/024; B01J 37/086
USPC ....... 502/302–304, 332, 334, 349, 355, 415, 502/439
See application file for complete search history.

(56) References Cited

U.S. PATENT DOCUMENTS

| | | | |
|---|---|---|---|
| 10,493,433 B2 * | 12/2019 | Xu | B01J 23/42 |
| 10,603,658 B1 * | 3/2020 | Makino | B01J 21/04 |
| 10,618,029 B2 * | 4/2020 | Goto | B01J 20/28059 |
| 10,953,395 B2 * | 3/2021 | Goto | C04B 38/0645 |
| 10,974,198 B2 | 4/2021 | Wei et al. | |
| 10,989,092 B2 * | 4/2021 | Yamamoto | F01N 3/0211 |
| 11,187,130 B2 * | 11/2021 | Yamamoto | F01N 3/2828 |
| 11,298,685 B2 * | 4/2022 | Goto | F01N 3/2828 |
| 11,298,686 B2 * | 4/2022 | Goto | F01N 3/101 |
| 11,298,687 B2 * | 4/2022 | Goto | B01J 23/44 |
| 11,433,382 B2 * | 9/2022 | Usui | B01D 39/20 |
| 11,511,458 B2 * | 11/2022 | Goto | B01J 37/08 |
| 11,511,459 B2 * | 11/2022 | Goto | C04B 35/64 |
| 11,618,009 B2 * | 4/2023 | Goto | F01N 3/28 502/304 |
| 2012/0077669 A1 | 3/2012 | Müller-Stach | |
| 2016/0175830 A1 | 6/2016 | Tsuda et al. | |
| 2016/0175937 A1 | 6/2016 | Xia | |
| 2019/0143312 A1 * | 5/2019 | Goto | C04B 35/6303 502/304 |
| 2020/0222889 A1 * | 7/2020 | Goto | C04B 38/0009 |
| 2020/0222890 A1 * | 7/2020 | Goto | F01N 3/28 |
| 2022/0280921 A1 | 9/2022 | Koito et al. | |
| 2022/0297095 A1 * | 9/2022 | Zheng | B01J 37/0009 |
| 2023/0001386 A1 * | 1/2023 | Kazi | B01J 35/0046 |

FOREIGN PATENT DOCUMENTS

| | | |
|---|---|---|
| WO | 2016123523 A1 | 8/2016 |
| WO | 2016123534 A1 | 8/2016 |
| WO | 2021035019 A1 | 2/2021 |
| WO | 2021075313 A1 | 11/2021 |

OTHER PUBLICATIONS

Kongkaew, S.; Kanatharana, P.; Thavarungkul, P.; Limbut, W. A Preparation of Homogeneous Distribution of Palladium Nanoparticle on Poly (Acrylic Acid)-Functionalized Graphene Oxide Modified Electrode for Formalin Oxidation. Electrochimica Acta 2017, 247, 229-240.

Kuwahara, Y.; Kango, H.; Yamashita, H. Pd Nanoparticles and Aminopolymers Confined in Hollow Silica Spheres as Efficient and Reusable Heterogeneous Catalysts for Semihydrogenation of Alkynes. ACS Catal. 2019, 9 (3), 1993-2006. https://doi.org/10.1021/acscatal.8b04653.

Long, W.; Brunelli, N. A.; Didas, S. A.; Ping, E. W.; Jones, C. W. Aminopolymer-Silica Composite-Supported Pd Catalysts for Selective Hydrogenation of Alkynes. ACS Catal. 2013, 3 (8), 1700-1708. https://doi.org/10.1021/cs3007395.

Veisi, H.; Pirhayati, M.; Kakanejadifard, A.; Mohammadi, P.; Abdi, M. R.; Gholami, J.; Hemmati, S. In Situ Green Synthesis of Pd Nanoparticles on Tannic Acid-Modified Magnetite Nanoparticles as a Green Reductant and Stabilizer Agent: Its Application as a Recyclable Nanocatalyst (Fe3O4@TA/Pd) for Reduction of 4-Nitrophenol and Suzuki Reactions. ChemistrySelect 2018, 3 (6), 1820-1826.

* cited by examiner

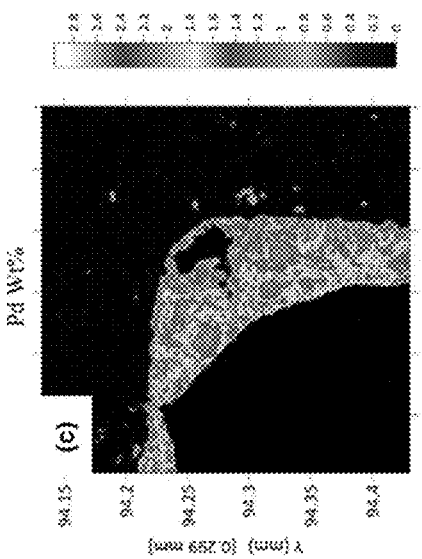
Figure 1a
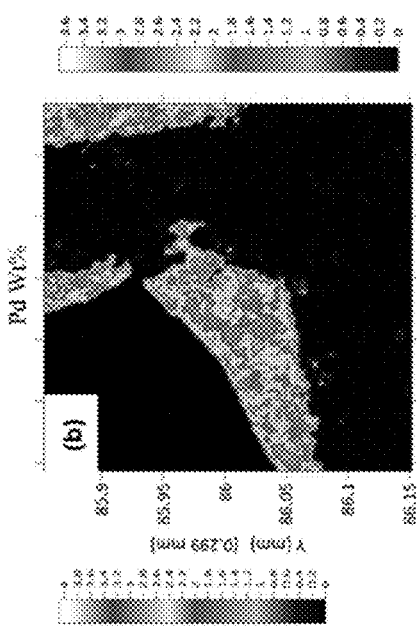
Figure 1b
Figure 1c
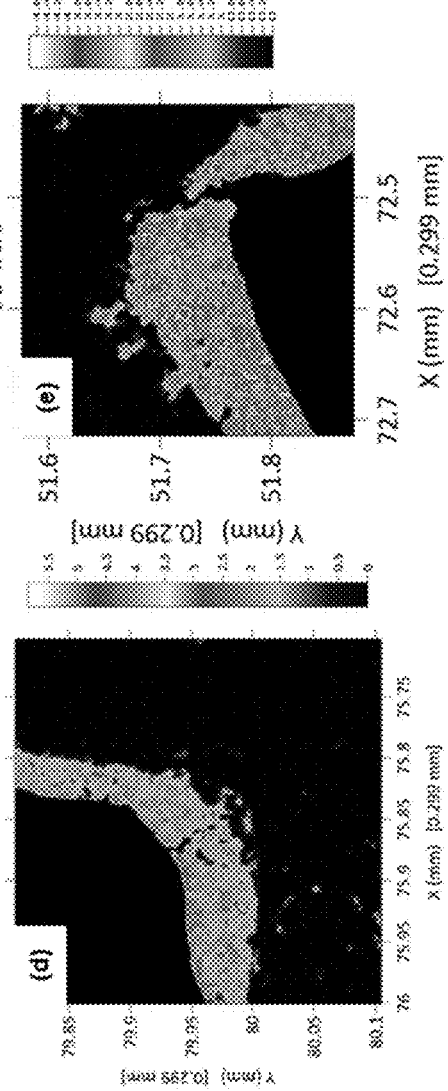
Figure 1d
Figure 1e

PALLADIUM FIXING AND LOW FRESH OXYGEN STORAGE CAPACITY USING TANNIC ACID AS A COMPLEXING AND REDUCING AGENT

FIELD OF THE INVENTION

The invention relates to a method of manufacturing a catalyst article, a catalyst article obtainable by the method, an emission treatment system and a method of treating an exhaust gas.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized gamma alumina and ceria-containing oxygen storage materials. The supported catalyst is washcoated on a ceramic monolithic substrate.

Conventional preparation of a TWC washcoat slurry generally involves the use of a solution of an inorganic PGM precursor, e.g. nitrate, acetate, hydroxide or chloride salt, to allow the PGM element to be deposited onto the oxide support via incipient wetness or wet impregnation. Promoter salts are also often added to the washcoat formulations for enhanced TWC performance. Once the monolithic substrate is washcoated with the as-prepared slurry, drying and calcination steps are followed to decompose the inorganic salts and to allow PGM and promoter elements to be fixed onto the support materials. It is known that the performance of supported metal catalysts depends on the structure and composition of the metal nanoparticles, and the nature of the support. Conventional TWCs prepared using the above method often provide only limited control over the structure of the catalytically active species (i.e. average PGM particle size and composition, location of the active components, and metal-support interactions). This is mainly due to metal migration and grain growth during high temperature calcination process.

With increasingly stringent environmental regulations, TWCs with higher emissions abatement efficiency are needed. On the other hand, with increasing PGM cost, there is an urgent need of reducing PGM loading without compromising TWC performance. A better control of the PGM particle size and metal-support interaction is essential in optimizing the TWC performance. Furthermore, a uniformed PGM particle size distribution may contribute to a reduction in the extent of metal sintering due to Ostwald Ripening, as often occurs during a fuel cutoff process, an engine strategy used for enhanced fuel economy. Also, for Pd-based TWCs with a Ba component as an additive, it is important to control the locations of both palladium and barium for optimizing the synergistic interactions with the active Pd, additive species, and support components. Moreover, in catalyst articles prepared by conventional methods, any additional oxygen storage capacity (OSC) that may be provided by Pd is very unstable, i.e. very high when fresh but drops substantially after aging. This is thought to be due, in part, to sintering of the Pd during ageing and/or migration of the Pd, which in conventional methods is not generally very securely fixed to the support material, for example, thereby deactivating the OSC effect of the supported Pd.

The catalyst light-off is the minimum temperature necessary to initiate the catalytic reaction. In particular, the light-off temperature is the temperature at which conversion reaches 50%. There is a need for catalyst articles with reduced light-off temperatures.

US 2012/0077669 A1 describes a polymer-assisted synthesis of a supported metal catalyst for automotive applications. The polymers used in the examples include poly (vinylpyrrolidone), poly(acrylic acid), and poly (ethyleneimine). In the described synthesis procedures, the support (alumina powder) is first impregnated with a polymer-containing aqueous solution. The impregnated support is then separated from the above solution by filtration and drying steps. The dried impregnated support is further impregnated with a PGM precursor solution by incipient wetness impregnation. The as-described process involves multiple steps for the formation of as-claimed supported metal catalysts, which increases the cost and difficulty for commercial-scale production. US 2012/0077669 A1 indicates that a lean burn engine is preferably used, such as a diesel engine or a lean burn gasoline engine, for the application of the technology.

SUMMARY OF THE INVENTION

One aspect of the present disclosure is directed to a method of manufacturing a catalyst article, the method comprising: providing a complex of a polyphenol and a PGM, the polyphenol comprising an ester functional group, the PGM comprising palladium; providing a support material; applying the complex to the support material to form a loaded support material; disposing the loaded support material on a substrate; and heating the loaded support material to form nanoparticles of the PGM on the support material.

Another aspect of the present disclosure is directed to a catalyst article obtainable by the method in the first aspect.

The invention also encompasses an exhaust system for internal combustion engines that comprises the catalyst article in the second aspect.

Another aspect of the present disclosure is directed to a method of treating an exhaust gas, the method comprising: providing the catalyst article of the second aspect; and contacting the catalyst article with an exhaust gas.

BRIEF DESCRIPTION OF THE DRAWINGS

FIG. 1a shows an EPMA mapping image of Pd for Reference Example 1. FIG. 1b shows an EPMA mapping image of Pd for Example 1. FIG. 1c shows an EPMA mapping image of Pd for Example 2. FIG. 1d shows an EPMA mapping image of Pd for Example 3.

FIG. 1e shows an EPMA mapping image of Pd for Example 4.

DETAILED DESCRIPTION OF THE INVENTION

Figures 2A, 2B, 2C, 2D, 2E:
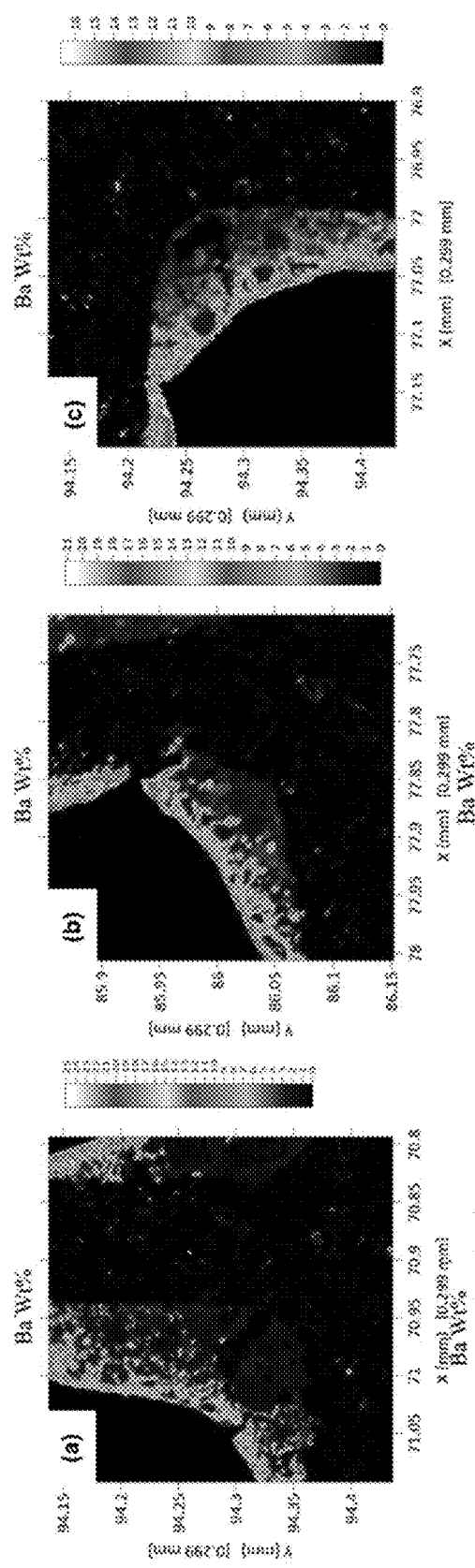
FIG. 2a shows an EPMA mapping image of Ba for Reference Example 1.
FIG. 2b shows an EPMA mapping image of Ba for Example 1.
FIG. 2c shows an EPMA mapping image of Ba for Example 2.
FIG. 2d shows an EPMA mapping image of Ba for Example 3.
FIG. 2e shows an EPMA mapping image of Ba for Example 4.

The present invention seeks to tackle at least some of the problems associated with the prior art or at least to provide a commercially acceptable alternative solution thereto.

In a first aspect, the present invention provides a method of manufacturing a catalyst article, the method comprising:
  providing a complex of a polyphenol and a PGM, the polyphenol comprising an ester functional group, the PGM comprising palladium;
  providing a support material;
  applying the complex to the support material to form a loaded support material;
  disposing the loaded support material on a substrate; and
  heating the loaded support material to form nanoparticles of the PGM on the support material.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when used in an emission treatment system, the catalyst article manufactured by the method of the present invention may exhibit favourable catalytic activity, in particular favourable three-way catalytic activity. For example, the catalyst article may exhibit favourable light-off performance, in particular conversions of NO, CO and total hydrocarbons, during three-way catalytic emissions abatement for a stoichiometric gasoline engine. Such favourable catalytic activity and light-off performance may be superior to that exhibited by conventional catalyst articles with the same/similar PGM specie(s), loading(s), support(s), and configuration(s). The catalyst article may be more durable in comparison to conventional catalyst articles. In other words, such favourable catalytic activity may be exhibited even after aging.

Advantageously, such superior performance may facilitate the use of lower loadings of PGMs in comparison to conventional catalyst articles without compromising catalytic performance. This may be beneficial in view of the high cost of such metals, such as palladium. Furthermore, such superior performance may facilitate the partial/complete substitution of high cost PGMs with lower cost PGMs or other transition metals without compromising catalytic performance.

Without being bound by theory, it is hypothesised that such superior performance may be provided by a favourable particle size distribution of the PGM nanoparticles on the support material. During PGM-polyphenol complexation, ions of PGM may react with ester functional groups, with the same predictable amount of PGM ions "uptaken" by each polymer unit structure, wherein the total amount of PGM "uptaken" is determined by the polymer molecular structure/size and PGM-polyphenol coordination ratio. Each complex may then react/interact with surface functional groups (e.g. hydroxyl groups) or surface charges to allow "anchoring" of PGM-polyphenol complexes onto the support material surface. The "anchored" PGM-polyphenol complexes may be separated apart due to polymeric steric effects and the available amount of support material surface functional groups/charges. The interaction between the complex and support material functional groups may increase PGM uptake by the support, compared to catalyst prepared by conventional methods. Without being bound by theory, it is also hypothesized that such even separation may lead to a narrower particle size distribution of PGM nanoparticles (more uniformed particle sizes) upon heating (calcination), which further leads to a reduction in excess agglomeration and/or sintering of PGM particles during ageing and/or fuel-cut events. In other words, compared to conventional catalyst, a more sintering-resistant catalyst article may be obtained by using the method of the present invention.

When used in an emission treatment system, surprisingly such a catalyst article may provide lower oxygen storage capacity (OSC) and a smaller OSC difference between the fresh and aged catalyst article. A high loading of Pd (relative to Rh, for example) is generally required on such catalyst articles for TWC applications because of the relatively low activity of Pd compared to Rh, for example. In addition to any OSC effect of the support material, for example, this large amount of Pd may also contribute to the OSC effect. Without wishing to be bound by theory this is thought to be due to reversible conversion between Pd and Pd oxide at engine operating temperatures. However, the OSC effect of Pd is very unstable, i.e. very high when fresh but drops substantially after aging. This is thought to be due, in part, to sintering of the Pd during ageing and/or migration of the Pd, which in conventional methods is not generally very securely fixed to the support material, for example, thereby deactivating the OSC effect of the supported Pd.

However, as described herein the method of the present invention may provide improved Pd fixing and Pd distribution. Advantageously, it has been surprisingly found that this may result in a catalyst article having a smaller OSC difference between the fresh and aged catalyst article, which is thought to be due to a more stable OSC ability of the support Pd, for example. In other words, the OSC effect of the catalyst article may be more stable throughout its lifetime, even after ageing. This may be very desirable in practice at least because engine calibration (i.e. for the feedback loop between the engine and exhaust system in order to control the air-to-fuel ratio) is usually carried out using the fresh catalyst article and is not re-calibrated after ageing or throughout the vehicle's lifetime. Therefore any difference between the OSC ability of the fresh catalyst article and the aged catalyst article may reduce the performance of the engine and exhaust system and may therefore result in less efficient emissions reduction in the exhaust system. Thus, if the difference between the fresh and aged OSC ability of the catalyst article is minimised, then the calibration between the engine and the exhaust system may remain more accurate throughout the lifetime of the vehicle, thereby helping to improve the efficiency of emissions reduction throughout the lifetime of the vehicle, even after ageing.

Moreover, due to the improved fixing of the Pd to the support material that may be provided by the method of the present invention, significantly less wicking of the Pd or washcoat layers through the substrate and/or mixing of the washcoat layers may be observed. In other words, catalyst articles manufactured by the method of the present invention may exhibit stronger/more reliable fixing of the PGMs to the support material compared to catalyst articles manufactured by conventional methods. As well as aesthetic improvements in such catalyst articles, the catalyst articles manufactured by the method of the present invention may therefore exhibit improved catalytic activity. This is at least because mixing of the catalytically-active PGMs between any distinct washcoat layers in the catalyst article may be reduced, which may thereby reduce the likelihood that any of the washcoat layers are deactivated. This, in turn, may help to maintain the catalytic activity of the overall catalyst article as high as intended when the catalyst article is fresh, as well as after ageing. Keeping the PGMs of any distinct washcoat layers within their intended respective layers can be important for maintaining their intended catalytic purpose, whether for oxidation or reduction, for example. For example, it is known that direct interactions between Pd and Rh can reduce the catalytic activity of the individual components, especially the catalytic functions of the Rh component.

Furthermore, depending on the order of the steps and the order of the addition of the support material, the method of the present invention may be used to fix the PGM, for example Pd, to any standard support material. In other words, if there are multiple different support materials in the washcoat, then the method of the present invention may be used to target the PGM, e.g. Pd, to the desired support material by controlling the order of the steps, such as whether the support material is first combined with the PGM precursor or with the complex of a polyphenol and a PGM, for example.

In comparison to the method of US 2012/0077669 A1, the method of the present invention is a simpler and more efficient "one-pot" method, without the need for pH adjustment, for example. The method of the present invention does not require separate impregnation, filtration, and drying steps for depositing the polymer molecules onto the support material. By using the method of the present invention, the yield of polymer-support and PGM-polymer interactions may increase because each polymer molecule added is utilized for interactions. In contrast, in US 2012/0077669 A1, only limited amount of polymers may stay on the support after the filtration and washing steps. Furthermore, the catalyst article prepared by the method of the present invention may be specifically used as a three-way catalyst for stoichiometric gasoline emissions abatement. In contrast, the catalyst article made by the method of US 2012/0077669 A1 has a particular application in lean burn diesel or gasoline engines.

The term "catalyst article" used herein may encompass an article in which a catalyst is supported thereon or therein. The article may take the form of, for example, a honeycomb monolith, or a filter, e.g. a wall flow filter or a flow-through filter. The catalyst article may be for use in an emission treatment system, in particular an emission treatment system for a gasoline engine, preferably a stoichiometric gasoline engine. The catalyst article may be for use in three-way catalysis.

Providing a complex of a polyphenol and a PGM typically involves providing the complex in solution, for example an aqueous or alcohol solution. Providing a complex of a polyphenol and a PGM typically involves mixing inorganic PGM precursor(s) and polyphenol in pure or solution form in an aqueous medium, for example mixing PGM nitrate and polyphenol in water.

The term "polyphenol" as used herein encompasses polymers containing several hydroxyl groups on aromatic rings. Polyphenols are generally moderately water-soluble compounds. Polyphenols may be natural or synthetic, but in the present invention are preferably naturally occurring so as to render the method more environmentally friendly. The term "polyphenol" as used herein may encompass a polymer with a weight average molecular weight of 500 to 4,000 g/mol, greater than 12 phenolic hydroxyl groups and with 5 to 7 aromatic rings per 1,000 g/mol. The polyphenol may be, for example, a phenolic acid (e.g. tannic acid, caffeic acid), a flavonoid (e.g. flavone, flavonol, flavanol, flavanone, isoflavone), a stilbene, or a lignin (polyphenols derived from phenylalanine found in flax seed and other cereals).

The polyphenol comprises an ester functional group, typically a carboxylate ester functional group. The polyphenol preferably comprises two or more ester functional groups and/or carboxylate ester functional groups. The terms "ester functional group" and "carboxylate ester functional group" may encompass a functional group comprising a carboxyl group bonded to an OR group, i.e.

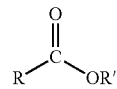

The PGM comprises palladium. Palladium may be particularly suitable for carrying out three-way catalysis. In addition, palladium is expensive meaning that it would be advantageous to be able to provide similar levels of catalytic activity for the same amount of metal.

Furthermore, the use of palladium in the method of the present invention may result in particularly favourable perturbated light-off performance. The PGM may be in the form of an alloy. In addition to palladium, the PGM may comprise other PGMs such as, for example, one or more of rhodium, platinum, ruthenium, osmium and iridium.

The complex may have a PGM atom to ester group ratio of from 2:1 to 1:10, preferably from 1:1 to 1:8, more preferably from 1:2 to 1:5. The complex may have a palladium atom to ester group ratio of from 2:1 to 1:10, preferably from 1:1 to 1:8, more preferably from 1:2 to 1:5.

The support material may be any material that is capable of supporting the complex and nanoparticles thereon or therein. The support material may take any form, but is typically in the form of a powder, more typically a high surface area powder. When the method of the present invention is used to prepare a catalysed filter, such as a wall flow filter or flow-through filter, the support material will typically be in the form of a powder having a D50 of, for example, from 0.1 to 30 μm, more typically from 0.5 to 25 μm as measured using TEM, even more typically 1 to 20 μm. Such particle sizes may facilitate desirable rheological properties of a slurry used to coat the filter. The support material may function as a washcoat. The support material may be a washcoat or may be part of a washcoat.

The support material may also serve as an oxygen storage material, which stores and releases oxygen respectively at fuel lean and fuel rich conditions, for facilitating the three-way catalytic conversion.

Applying the complex to the support material typically involves contacting the complex and support material in the presence of a solvent (typically water) so as to produce a slurry. The term "slurry" as used herein may encompass a liquid comprising insoluble material, e.g. insoluble particles. The slurry may comprise (1) solvent; (2) soluble content, e.g. unreacted polyphenol polymer, inorganic PGM and promoter precursor(s), and PGM-polymer complex (outside of the support); and (3) insoluble content, e.g. support particles with and without interactions with the polymer and metal precursors. The slurry is typically stirred, more typically for at least 10 minutes, more typically for at least 30 minutes, even more typically for at least an hour. Increased contacting and/or stirring times may increase the amount of complex that is loaded onto the support material.

The term "loaded support material" as used herein may encompass a support material that has the PGM-polyphenol complex loaded thereon (e.g. on the surface of a high-surface area metal oxide support material) and/or loaded therein (e.g. within the pores of a zeolite support material). The complex is typically fixed to the support, for example by electrostatic forces, hydrogen bonds, coordinate bonds, covalent bonds, and/or ionic bonds. For example, in the case of an oxide, ester functional groups (e.g. carboxylate ester functional groups) in the polyphenol and surface hydroxyl groups on the support may interact through electrostatic forces or hydrogen-bond formation.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

Disposing the loaded support material on a substrate may be carried out using techniques known in the art. Typically, the loaded support material is disposed on the substrate by pouring a slurry of the loaded support material into the inlet of the substrate using a specific moulding tool in a predetermined amount. As discussed in more detail below, subsequent vacuum and drying steps may be employed during the disposition step. When the support is a filter block, the loaded support material may be disposed on the filter walls, within the filter walls (if porous) or both.

Heating the loaded support material is typically carried out in an oven or furnace, more typically a belt or static oven or furnace, typically in hot air at a specific flow from one direction. The heating may comprise calcination. The heating may also comprise drying. The drying and calcination steps may be continuous or sequential. For example, a separate washcoat may be applied after the substrate is already washcoated and dried with a previous washcoat. A washcoated substrate can also be dried and calcined using one continuous heating program if coating is completed. During the heating, the complex may at least partially, substantially or completely decompose. In other words, the ligands of the complex, i.e. the polyphenol, are at least partially, substantially or completely removed or separated from the PGM, and are removed from the final catalyst article. Particles of such separated PGMs may then begin to form metal-metal and metal-oxide bonds. As a result of the heating (calcination), the substrate is typically substantially free of polyphenol, more typically completely free of polyphenol.

The term "nanoparticle" as used herein may encompass a particle having a diameter of from 0.01 nm to 100 nm as measured by TEM. The nanoparticles may be in any shape, e.g. a sphere, a plate, cubic, cylindrical, hexagonal or a rod, but are typically spherical. The largest dimension of the nanoparticle (i.e. the diameter if the nanoparticle is spherical), will typically be from 0.5 to 10 nm, more typically from 1 to 5 nm, as measured by TEM.

Following the heating step, the substrate is typically cooled, more typically to room temperature. The cooling is typically carried out in air with or without cooling agent/media, typically without cooling agent.

The polyphenol preferably comprises tannic acid. The term "tannic acid" as used herein may encompass a mixture of polygalloyl glucoses or polygalloyl quinic acid esters with the number of galloyl moieties per molecule ranging from 2 up to 12 depending on the plant source used to extract the tannic acid. Tannic acid may be a natural phenolic compound and may be extracted from, inter alia, bark of oak, hemlock, chestnut and mangrove; the leaves of certain sumacs; and fruits of many plants. The term "tannic acid" as used herein may encompass a compound consisting of a central glucose ring and 10 galloyl groups, i.e. decagalloyl glucose, as shown by the following structural formula:

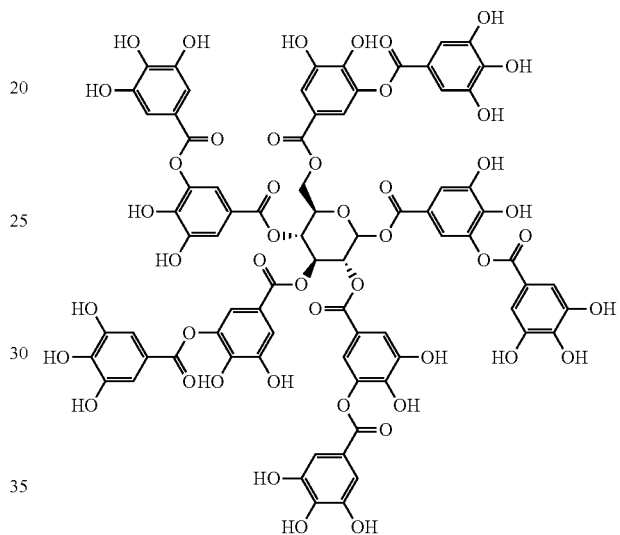

Such a compound has the IUPAC name 1,2,3,4,6-penta-O-{3,4-dihydroxy-5-[(3,4,5-trihydroxybenzoyl)oxy]benzoyl}-D-glucopyranose or 2,3-dihydroxy-5-({[(2R,3R,4S,5R,6R)-3,4,5,6-tetrakis({3,4-dihydroxy-5-[(3,4,5-trihydroxyphenyl)carbonyloxy]phenyl}carbonyloxy)oxan-2-yl]methoxy}carbonyl)phenyl 3,4,5-trihydroxybenzoate. Each of the five hydroxyl groups of the glucose molecule is esterified with a molecule of digallic acid.

Tannic acid may coordinate with metal ions through hydrogen bonds or covalent bonds.

The PGM-tannic acid complex may be fixed onto supports, e.g. metal oxide supports, in a washcoat, where the carboxylate ester functional groups in the tannic acid ligands and surface hydroxyl groups on the support may interact through electrostatic forces or hydrogen-bond formation.

Since tannic acid is naturally occurring, the use of tannic acid to form the PGM complex may be more environmentally friendly in comparison to the use of other, non-naturally occurring ligands. Tannic acid favourably has a decomposition point in the range 210 to 215° C. It is also soluble in water (1 g of tannic acid dissolves in 0.35 ml of water at standard temperature and pressure). The use of tannic acid may result in particularly favourable perturbated light-off performance.

The polyphenol preferably has a weight average molecular weight $M_W$ of from 500 to 4,000, more preferably from 1,000 to 2,000 g/mol, even more preferably from 1,600 to 1,800 g/mol measured by light scattering. The weight average molecular weight Mw is determined by the formula:

$$\overline{M}_w = \frac{\sum_i N_i M_i^2}{\sum_i N_i M_i}$$

where $N_i$ is the number of molecules of molecular mass $M_i$. The use of such weight average molecular weights may result in particularly favourable perturbated light-off performance.

The polyphenol preferably has a number average molecular weight $M_n$ of from 500 to 4,000 g/mol measured by gel permeation chromatography (GPC). The number average molecular weight $M_w$ is determined by the formula:

$$\overline{M}_n = \frac{\sum_i N_i M_i}{\sum_i N_i}$$

where again $N_i$ is the number of molecules of molecular mass $M_i$. The use of such number average molecular weights may result in particularly favourable perturbated light-off performance.

The PGM comprises palladium. Preferably, the PGM consists essentially of, more preferably consists of palladium. Palladium is a particularly expensive PGM and forms particularly suitable complexes with polyphenols, especially tannic acid. The use of such a metal in the method of the present invention may result in particularly favourable perturbated light-off performance. The PGM may comprise predominantly palladium, i.e. at least 50 wt. % palladium, typically at least 80 wt. % palladium, more typically at least 95 wt. % palladium, even more typically at least 99 wt. % palladium based on the total weight of PGM.

After heating the loaded support material the substrate preferably comprises from 50 g/ft$^3$ to 200 g/ft$^3$ of the PGM, more preferably from 80 g/ft$^3$ to 150 g/ft$^3$ of the PGM. In other words, the concentration of PGM applied to the substrate via the loaded support material may be such that after heating the loaded support material the substrate comprises from 50 g/ft$^3$ to 200 g/ft$^3$ of the PGM, more preferably from 80 g/ft$^3$ to 150 g/ft$^3$ of the PGM. Obtaining such a loading of the PGM on the substrate would be easily achieved by the skilled person by, for example, using either a higher or lower concentration of the complex of the polyphenol and the PGM and/or a higher or lower PGM atom to ester group ratio. In other words, it is well within the skilled person's capabilities to provide a substrate via the method of the present invention with the desired level of PGM loading. For example, from 50 g/ft$^3$ to 200 g/ft$^3$ of the PGM, more preferably from 80 g/ft$^3$ to 150 g/ft$^3$ of the PGM may be applied to the support material in the step of applying the complex to the support material to form a loaded support material.

The support material preferably comprises an oxide, preferably one or more of $Al_2O_3$ (aluminum oxide or alumina), $SiO_2$, $TiO_2$, $CeO_2$, $ZrO_2$, $CeO_2$—$ZrO_2$, $V_2O_5$, $La_2O_3$ and zeolites. The oxide is preferably a metal oxide. The support material more preferably comprises alumina, even more preferably gamma-alumina. The support material preferably comprises ceria-zirconia. The support material preferably comprises alumina and ceria-zirconia. The alumina and/or ceria-zirconia is preferably doped, more preferably with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium, or sodium; even more preferably with an oxide of lanthanum, neodymium or yttrium. Such doped oxides are particularly effective as support materials. Preferably, the dopant is present in the alumina and/or ceria-zirconia in an amount of from 0.001 wt. % to 20 wt. %, and more preferably from 0.5 wt. % to 10 wt. %.

The support material is preferably in the form of a powder having a D90 of from 0.1 to 25 µm, more preferably from 0.5 to 5 µm.

The loaded support material is preferably disposed onto the substrate in the form of a slurry. A slurry is particularly effective at disposing a material onto a substrate, in particular for maximized gas diffusion and minimized pressure drop during catalytic conversion.

Providing the complex of a polyphenol and a PGM preferably comprises synthesising the complex in situ in the slurry.

The slurry is preferably prepared by a method comprising:
contacting a PGM salt and a polyphenol in water to form the complex of a polyphenol and a PGM in an aqueous solution, the PGM salt comprising palladium; and
applying the complex to the support material to form a loaded support material by contacting the support material with the aqueous solution;
optionally adding one or more of an oxygen storage material, preferably ceria-zirconia; a promoter salt; a binder; an acid or a base; a thickening agent; and a reducing agent to the aqueous solution. The optional step of adding one or more of an oxygen storage material, preferably ceria-zirconia; a promoter salt; a binder; an acid or a base; a thickening agent; and a reducing agent to the aqueous solution may be undertaken during any of the steps of said preferred method of preparing the slurry.

In an alternative preferred embodiment, the slurry may be prepared by a method comprising:
contacting a support material and an aqueous solution of a PGM salt to form a slurry comprising a PGM-salt-loaded support material, the PGM salt comprising palladium;
applying the complex of a polyphenol and a PGM to the support material to form a loaded support material by contacting the slurry comprising the PGM-salt-loaded support material and a polyphenol in water;
optionally adding one or more of an oxygen storage material, preferably ceria-zirconia; a promoter salt; a binder; an acid or a base; a thickening agent; and a reducing agent to the aqueous solution or the slurry comprising the PGM-salt-loaded support material. The optional step of adding one or more of an oxygen storage material, preferably ceria-zirconia; a promoter salt; a binder; an acid or a base; a thickening agent; and a reducing agent to the aqueous solution may be undertaken during any of the steps of said preferred method of preparing the slurry, but is preferably performed during the step in which the support material is supplied in each case.

Preferably, the steps of contacting a PGM salt and a polyphenol in water and contacting the slurry comprising the PGM-salt-loaded support material and a polyphenol in water in each alternative method of preparing the slurry comprise allowing sufficient reaction time for complexation to occur between the polyphenol and the PGM cations, for example such steps are typically carried out for at least 10 minutes, more typically for at least 30 minutes, even more typically for at least an hour, preferably with stirring. Without wishing to be bound by theory, it is thought that the step of applying the complex of a polyphenol and a PGM to the support material to form a loaded support material by contacting the slurry comprising the PGM-salt-loaded support material and a polyphenol in water in the second alternative method of preparing the slurry may be followed by subsequent reduction and precipitation of the PGM metal species on the support material.

In other words, the method of preparing the slurry may comprise first providing the complex of a polyphenol and a PGM in an aqueous solution followed by addition of the support and other optional components, or alternatively comprise first adding the support material and other optional components to an aqueous solution of a PGM precursor (i.e. PGM salt) followed by addition of the polyphenol.

Such a "one-pot" preparation methods may be simplified and lower cost in comparison to conventional methods. It may also maximize utilization of the polymers.

In other words, the steps of providing a complex of a polyphenol and a PGM; providing a support material; applying the complex to the support material to form a loaded support material; and disposing the loaded support material on a substrate may comprise:
  contacting a PGM salt and a polyphenol in water to form the complex of a polyphenol and a PGM in an aqueous solution, the PGM salt comprising palladium;
  adding the support material to the aqueous solution to form a slurry of loaded support material;
  optionally adding one or more of an oxygen storage material, preferably ceria-zirconia; a promoter salt; a binder; an acid or a base; a thickening agent; and a reducing agent to the slurry; and
  disposing the slurry on the substrate.

Alternatively, the steps of providing a complex of a polyphenol and a PGM; providing a support material; applying the complex to the support material to form a loaded support material; and disposing the loaded support material on a substrate may comprise:
  contacting a support material and an aqueous solution of a PGM salt to form a slurry comprising a PGM-salt-loaded support material, the PGM salt comprising palladium;
  adding the polyphenol to the slurry comprising the PGM-salt-loaded support material to form a slurry of loaded support material;
  optionally adding one or more of an oxygen storage material, preferably ceria-zirconia; a promoter salt; a binder; an acid or a base; a thickening agent; and a reducing agent to the aqueous solution or the slurry comprising the PGM-salt-loaded support material; and
  disposing the slurry on the substrate.

The loading may comprise washcoating.

The slurry preferably has a solids content of from 10 to 40%, preferably from 15 to 35%. Such a solids content may enable slurry rheologies suitable for disposing the loaded support material onto the substrate. For example, if the substrate is a honeycomb monolith, such solid contents may enable the deposition of a thin layer of washcoat onto the inner walls of the substrate. If the substrate is a wall flow filter, such solids contents may enable the slurry to enter the channels of the wall flow filter and may enable the slurry to enter the walls of the wall flow filter.

Preferably, the slurry further comprises one or more of:
  an oxygen storage material, preferably ceria-zirconia;
  a promoter salt;
  a binder;
  an acid or a base;
  a thickening agent; and
  a reducing agent.

Promotors may include, for example, a non-PGM transition metal element, a rare earth element, an alkali or alkali earth group element, and/or a combination of two or more of the above elements within the same or different groups in periodic table. The promotor salt may be a salt of such elements. A particularly preferred promotor is barium, with particularly preferred salts thereof being barium acetate, barium citrate and barium sulfate, or a combination thereof, more preferably barium citrate.

Binders may include, for example, an oxide material with small particle size to bind the individual insoluble particles together in washcoat slurry. The use of binders in washcoats is well known in the art.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include glactomanna gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

The term "reducing agent" as described herein may encompass a compound that can reduce the PGM cations to particles in its reduced state or even metallic state in situ during washcoat preparation.

An organic acid can be added that acts as a reductant for PGM and/or creates a reducing environment during the washcoat preparation at ambient temperature or elevated temperature (<100° C.) within certain period of time. Examples of a suitable organic acid may include citric acid, succinic acid, oxalic acid, ascorbic acid, acetic acid, formic acid, tannic acid, and combinations thereof.

In a preferred embodiment, the support material comprises alumina and the slurry further comprises ceria-zirconia. In another preferred embodiment, the support material comprises ceria-zirconia and the slurry further comprises alumina. In another preferred embodiment, the support material comprises alumina and ceria-zirconia.

The method preferably further comprises disposing a further slurry on the substrate, the further slurry comprising one or more of a further support material; an oxygen storage material; a promoter salt; a binder; an acid or a base; a thickening agent; and a reducing agent, wherein disposing the further slurry on the substrate takes place before disposing the support material on the substrate and/or after heating the loaded support material to form nanoparticles of the PGM on the support material. This may result in a catalyst article having multiple layers of different washcoats, for example a bottom washcoat containing, inter alia, palladium nanoparticles supported on alumina, and a top washcoat containing, inter alia, palladium nanoparticles supported on alumina. Further examples of such multiple layers are discussed in more detail below.

Disposing the loaded support material on a substrate preferably comprises contacting the slurry with the substrate (e.g. pouring the slurry into an inlet of the substrate) and optionally:
  applying a vacuum to the substrate, and/or drying the slurry on the substrate.

This may result in a favourable distribution of the loaded support material on the substrate.

The drying preferably occurs:
- at a temperature of from 60° C. to 200° C., more preferably from 70° C. to 130° C.; and/or
- for from 10 to 360 minutes, preferably from 15 to 60 minutes.

The substrate may be a "blank", i.e. un-washcoated, substrate. Alternatively, the substrate may have one or washcoats already loaded thereon. In such a situation, the final catalyst article may comprise multiple layers of different washcoats.

The substrate preferably comprises cordierite. Cordierite substrates are particularly suitable for use in catalyst articles.

The substrate is preferably in the form of a honeycomb monolith, a wall flow filter or a flow through filter.

The heating is preferably carried out:
- at a temperature of from 400° C. to 700° C., preferably from 400° C. to 600° C., more preferably from 450° C. to 600° C.; and/or
- for from 10 to 360 minutes, preferably from 35 to 120 minutes.

Lower temperatures and/or shorter heating times may result in insufficient decomposition of the complex and/or may result in high levels of polyphenol remaining in the substrate. Higher temperatures and/or longer heating times may lead to the particles of PGM having an unfavourably large particle size, presumably due to sintering. Higher temperatures and longer heating times may also lead to damage to the catalyst article.

The heating preferably comprises calcining. The term "calcining" as used herein may encompass a thermal treatment process in the absence of, or limited supply of, air or oxygen to bring about a thermal decomposition.

The nanoparticles preferably have a D50 of from 0.1 nm to 30 nm, more preferably from 0.5 to 25 nm, even more preferably from 1 to 20 nm. The D50 may be measured by TEM.

Such particle sizes may result in a favourable level of catalytic activity.

In a further aspect, the present invention provides a catalyst article obtainable by the method described herein, the catalyst article for use in an emission treatment system.

In comparison to conventional catalyst article, the catalyst article obtainable by the method described herein may contain PGM particles having favourably larger particle sizes and a favourable particle size distribution (e.g. a D50 of from 1 to 20 nm) in their fresh state. In addition, in comparison to conventional catalyst articles, the catalyst article obtainable by the method described herein may exhibit a more uniformed dispersion of PGM particles throughout the substrate.

When used in an emission treatment system, the catalyst article may exhibit favourable light-off performance, in particular for NO, CO and total hydrocarbons during three-way catalytic conversions for stoichiometric gasoline emissions abatement. The catalyst article may also exhibit the other favourable properties described herein, such as a lower fresh OSC capacity, and less fresh-to-aged OSC difference (in another word more stable OSC performance towards aging).

The catalyst is preferably for three-way catalysis.

The catalyst article may have a washcoat loading of from 1 g/in$^3$ to 3 g/in$^3$. Such a catalyst article may exhibit similar or higher catalytic activity in comparison to conventional catalyst articles but may be lower cost in view of the lower levels of PGM employed.

The substrate preferably comprises a wall flow filter substrate or a flow-through substrate.

In a preferred embodiment, the catalyst article comprises a bottom layer of support material having rhodium thereon and a top layer of support material having palladium thereon. In such a catalyst article, for example, the bottom layer may be provided by a method similar to that described herein or by any conventional method. In another preferred embodiment, the catalyst article comprises a bottom layer of support material having palladium thereon and a top layer of support material having rhodium thereon. In such a catalyst article, for example, the top layer may be provided by a method similar to that described herein or by any conventional method. The term "bottom layer" as used herein may encompass a layer (e.g. washcoat layer) that is closest to or in contact with the substrate (i.e. substrate walls). The term "top layer" as used herein may encompass a layer (e.g. a washcoat layer) that is more remote from the substrate (i.e. substrate walls) than the bottom layer, and may be situated on top of the bottom layer. In such layered catalyst articles, the top and/or bottom layer of support material may have a further PGM thereon, for example platinum. In such layered catalyst articles, the top and/or bottom layer may comprise multiple PGMs, i.e. may be bimetallic (e.g. contain Pd—Rh or Pd—Pt) or trimetallic (e.g. Pd—Rh—Pt). The catalyst article may comprise two or more catalyst zones, for example an upstream zone and a downstream zone. The zones may differ from each other by having different PGMs (e.g. Rh upstream and Pd downstream or vice versa) or differing by the amount of different type PGMs e.g. monometallic, bimetallic or trimetallic.

In such preferred embodiments, the support material preferably comprises alumina and ceria-zirconia.

The catalyst article, in particular in such preferred embodiments, preferably comprises from 2 g/ft$^3$ to 15 g/ft$^3$ rhodium, more preferably from 5 g/ft$^3$ to 10 g/ft$^3$ rhodium. Advantageously, such rhodium levels may be lower than those of conventional catalyst articles but without compromising catalytic activity.

The catalyst article, in particular in such preferred embodiments, preferably comprises from 50 g/ft$^3$ to 200 g/ft$^3$ palladium, more preferably from 80 g/ft$^3$ to 150 g/ft$^3$ palladium.

Advantageously, such palladium levels may be lower than those of conventional catalyst articles but without compromising catalytic activity.

In a preferred embodiment, the loaded support material is disposed on the substrate in the form of a slurry, the PGM comprises palladium, the support material comprises alumina and the slurry further comprises ceria-zirconia. In another preferred embodiment, the loaded support material is disposed on the substrate in the form of a slurry, the PGM comprises palladium, the support material comprises ceria-zirconia and the slurry further comprises alumina. In another preferred embodiment, the loaded support material is disposed on the substrate in the form of a slurry, the PGM comprises palladium and the support material comprises alumina and ceria-zirconia.

In a further aspect, the present invention provides an emission treatment system comprising the catalyst article described herein.

The emission treatment system is preferably for a gasoline engine.

The gasoline engine preferably operates under stoichiometric conditions.

In a further aspect, the present invention provides a method of treating an exhaust gas, the method comprising:

providing the catalyst article described herein; and contacting the catalyst article with an exhaust gas.

The exhaust gas is preferably an exhaust gas from a gasoline engine. The catalyst article is particularly suitable for treating such exhaust gas. The gasoline engine preferably operates under stoichiometric conditions.

The invention will now be described in relation to the following non-limiting examples.

Manufacture of Catalyst Articles

A number of catalyst articles were prepared according to the following examples:

Reference Example 1: Pd/Ceria-Zirconia Mixed Oxide and Gamma Alumina (with Pd Nitrate) Washcoated TWC Catalyst 1. Prepare a solution with required amount of Pd nitrate (Pd loading 131 g/ft$^3$).
2. Add ceria-zirconia mixed oxide (1 g/in$^3$) and gamma alumina (1 g/in), mix for 1 hr.
3. Add requirement amount of Ba acetate (Ba loading 400 g/ft$^3$) to the above slurry, mix for at least 30 min.
4. Adjust slurry solid content to 30%, add natrosol and mix overnight.
5. Coat single dose targeting 1.2 inch, dry with pilot plant air cure.
6. Fire the brick at 500° C. for 30 min in a static oven or a rotating oven.

Example 1: Pd/Ceria-Zirconia Mixed Oxide and Gamma Alumina (with Pd Modified by Tannic Acid—High Tannic Acid Loading) Washcoated TWC Catalyst; Barium Acetate as the Barium Source 1. Prepare a solution with required amount of Pd nitrate (Pd loading 131 g/ft$^3$).
2. Add ceria-zirconia mixed oxide (1 g/in$^3$) and gamma alumina (1 g/in$^3$), mix for 1 hr.
3. Add required amount of tannic acid (232 g/ft$^3$), targeting molar ratio of Tannic acid:Pd=1:9. Mix for at least 2 hrs.
4. Add requirement amount of Ba acetate (Ba loading 400 g/ft$^3$) to the above slurry, mix for at least 30 min.
5. Adjust slurry solid content to 30%, add natrosol and mix overnight.
6. Coat single dose targeting 1.2 inch, dry with pilot plant air cure.
7. Fire the brick at 500° C. for 30 min in a static oven or a rotating oven.

Example 2: Pd/Ceria-Zirconia Mixed Oxide and Gamma Alumina (with Pd Modified by Tannic Acid—Low Tannic Acid Loading) Washcoated TWC Catalyst; Barium Acetate as the Barium Source 1. Prepare a solution with required amount of Pd nitrate (Pd loading 131 g/ft$^3$).
2. Add ceria-zirconia mixed oxide (1 g/in$^3$) and gamma alumina (1 g/in$^3$), mix for 1 hr.
3. Add required amount of tannic acid (174 g/ft$^3$), targeting molar ratio of Tannic acid:Pd=1:12. Mix for at least 2 hrs.
4. Add requirement amount of Ba acetate (Ba loading 400 g/ft$^3$) to the above slurry, mix for at least 30 min.
5. Adjust slurry solid content to 30%, add natrosol and mix overnight.
6. Coat single dose targeting 1.2 inch, dry with pilot plant air cure.
7. Fire the brick at 500° C. for 30 min in a static oven or a rotating oven.

Example 3: Pd/Ceria-Zirconia Mixed Oxide and Gamma Alumina (with Pd Modified by Tannic Acid—Low Tannic Acid Loading) Washcoated TWC Catalyst; Barium Citrate as the Barium Source 1. Prepare a solution with required amount of Pd nitrate (Pd loading 131 g/ft$^3$).
2. Add ceria-zirconia mixed oxide (1 g/in$^3$) and gamma alumina (1 g/in$^3$), mix for 1 hr.
3. Add required amount of tannic acid (174 g/ft$^3$), targeting molar ratio of Tannic acid:Pd=1:12. Mix for at least 2 hrs.
4. Add requirement amount of Ba acetate (Ba loading 400 g/ft$^3$) to the above slurry, mix for at least 30 min.
5. Add required amount of citric acid (CA loading 560 g/ft$^3$) to the above mixture, mix for at least 2 hrs.
6. Adjust slurry solid content to 30%, add natrosol and mix overnight.
7. Coat single dose targeting 1.2 inch, dry with pilot plant air cure.
8. Fire the brick at 500° C. for 30 min in a static oven or a rotating oven.

Example 4: Pd/Ceria-Zirconia Mixed Oxide and Gamma Alumina (with Pd Modified by Tannic Acid—Low Tannic Acid Loading) Washcoated TWC Catalyst; Barium Sulfate as the Barium Source 1. Prepare a solution with required amount of Pd nitrate (Pd loading 131 g/ft$^3$).
2. Add ceria-zirconia mixed oxide (1 g/in$^3$) and gamma alumina (1 g/in$^3$), mix for 1 hr.
3. Add required amount of tannic acid (174 g/ft$^3$), targeting molar ratio of Tannic acid:Pd=1:12. Mix for at least 2 hrs.
4. Add requirement amount of Ba sulfate (Ba loading 400 g/ft$^3$) to the above slurry, mix for at least 30 min.
5. Adjust slurry solid content to 30%, add natrosol and mix overnight.
6. Coat single dose targeting 1.2 inch, dry with pilot plant air cure.
7. Fire the brick at 500° C. for 30 min in a static oven or a rotating oven.

EPMA (Electron Probe Micro-Analyzer) Pd and Ba Elemental Mapping Images

FIG. 1a-1e show EPMA mapping images of Pd of reference catalyst (Reference Example 1—FIG. 1a) vs. modified catalysts using tannic acid (TA) and with the addition of different Ba salts (FIG. 1b-1e). Compared to (a) reference catalyst (Reference Example 1—FIG. 1a), more uniformed Pd dispersions were shown when TA at (b) high loading (Example 1—FIGS. 1b) and (c) low loading (Example 2—FIG. 1c) were used for Pd modification. In (a) Reference Example 1, Pd accumulates to the surface layer of the washcoat.

By contrast, Pd-TWC modified by TA showed improved Pd distribution throughout the entire depth of the washcoat. Pd distribution also slightly improved when (d) citric acid (Example 3—FIG. 1d) was added to complex with Ba (as Barium acetate) in situ, and (e) when BaSO$_4$ (Example 4—FIG. 1e) was used instead of Barium acetate.

FIGS. 2a-2e show EPMA mapping images of Ba of reference catalyst (Reference Example 1—FIG. 2a) vs. modified catalysts using TA and with addition of different Ba salts (FIGS. 2a-2e). Compared to (a) Reference Example 1 (FIG. 2a), (b)-(c) catalysts modified by TA (Examples 1-2—Examples 2b-2c) showed little effect in Ba fixing. By contrast, when (d) citric acid (Example 3—FIG. 2d) was added to complex with Ba, more uniformed Ba distribution was observed. (e) Ba addition as BaSO$_4$ (Example 4—FIG. 2e) also showed uniformed Ba distribution but with significantly increased Ba particle size, since BaSO$_4$ was insoluble in water throughout the washcoat preparation process.

Elemental Correlation Extracted from EPMA Images

Figure 3:
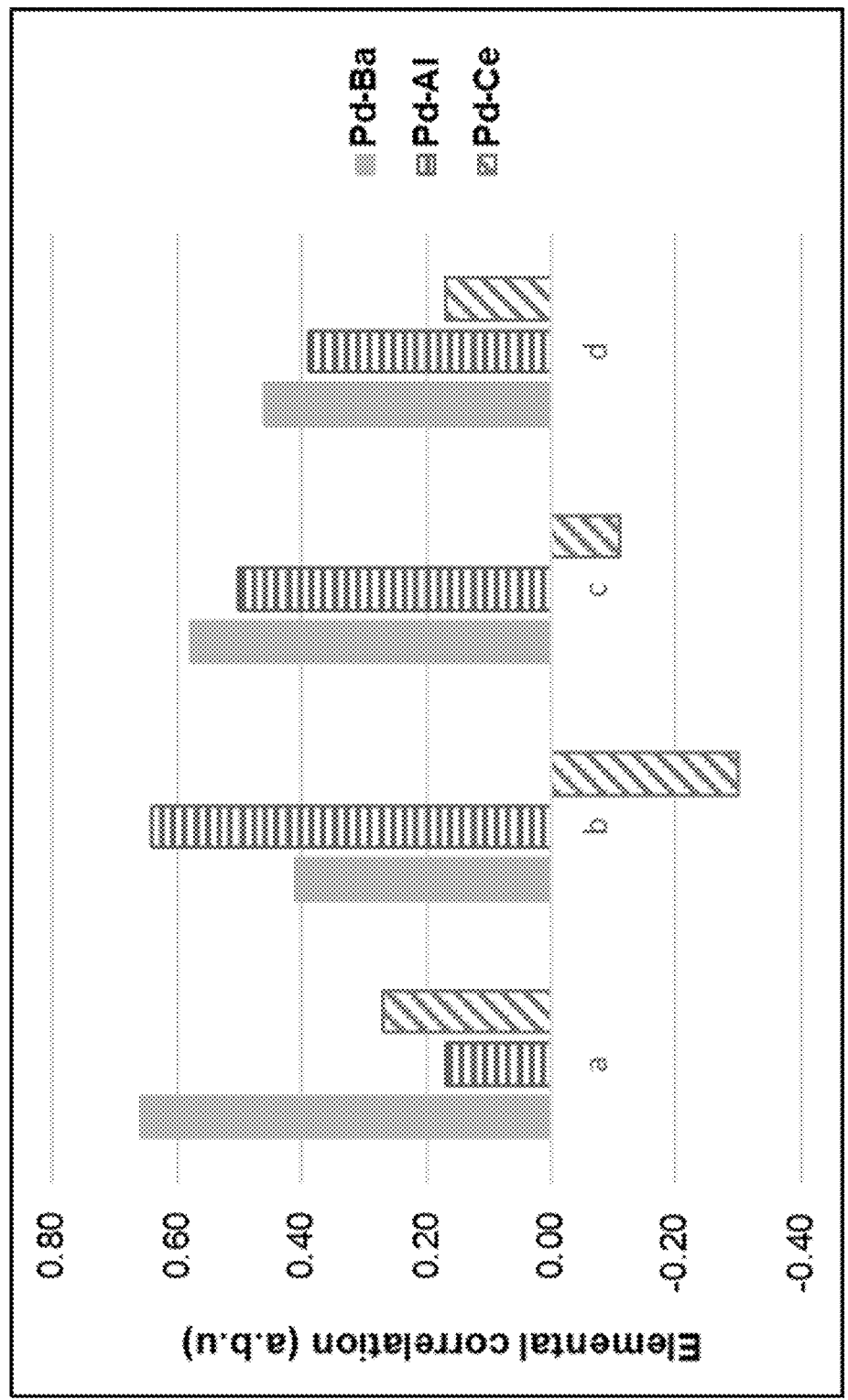
FIG. 3 shows elemental correlation (Pd—Ba, Pd—Al, and Pd—Ce) extracted from EPMA images of Pd-TWC washcoats of Reference Example 1 and Examples 1-4.

FIG. 3 shows elemental correlation (Pd—Ba, Pd—Al, and Pd—Ce) extracted from EPMA images of Pd-TWC washcoats of Reference Example 1 and Examples 1-4. Compared to (a) Reference Example 1, TA modification in washcoats (b-d) Examples 1-3 significantly increased Pd correlation with Al, indicating increased Pd fixing on alumina. Additionally, Ba-citric acid interaction in washcoat (d) (Example 3) promoted Pd—Ba interaction and Pd fixing on ceria.

Oxygen Storage Capacity

Figure 4:
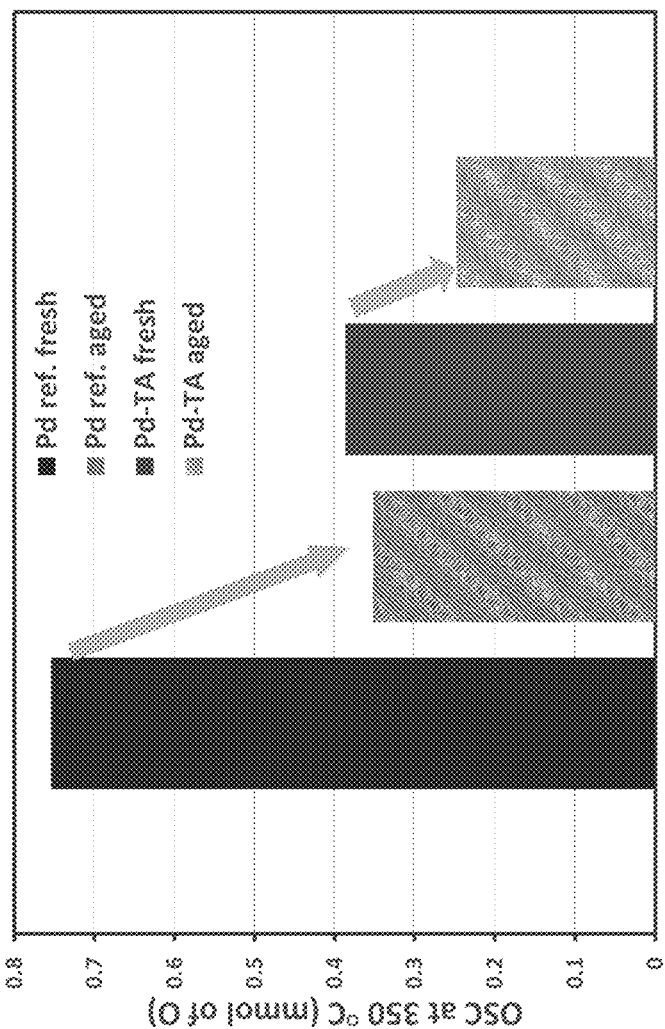
FIG. 4 shows oxygen storage capacity (OSC) of fresh and aged Pd-TWC without or with tannic acid modification.

FIG. 4 shows oxygen storage capacity (OSC) of fresh and aged Pd-TWC without (Reference Example 1) or with (Pd-TA) tannic acid modification. Compared to Reference Example 1, lower fresh OSC and lower fresh-to-aged difference was observed with TA-modified catalyst (Example 1).

Perturbated Light-Off Performance

Figure 5A:
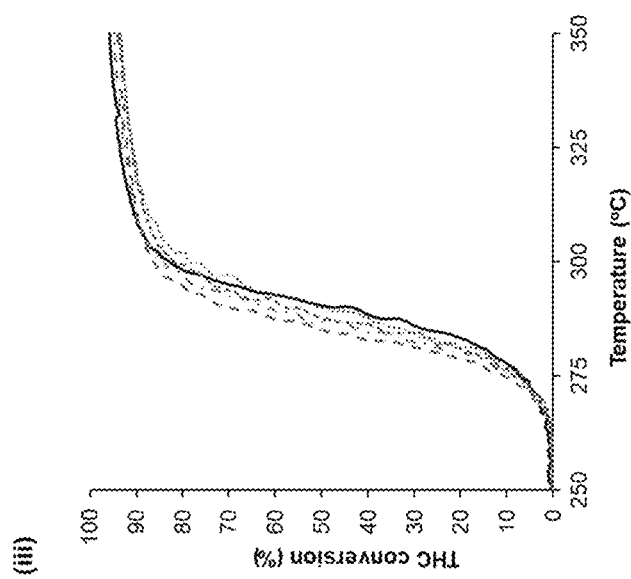
FIG. 5a shows $NO_x$ conversion results of perturbated light-off performance testing of Reference Example 1 and Examples 1-4.
Figure 5B:
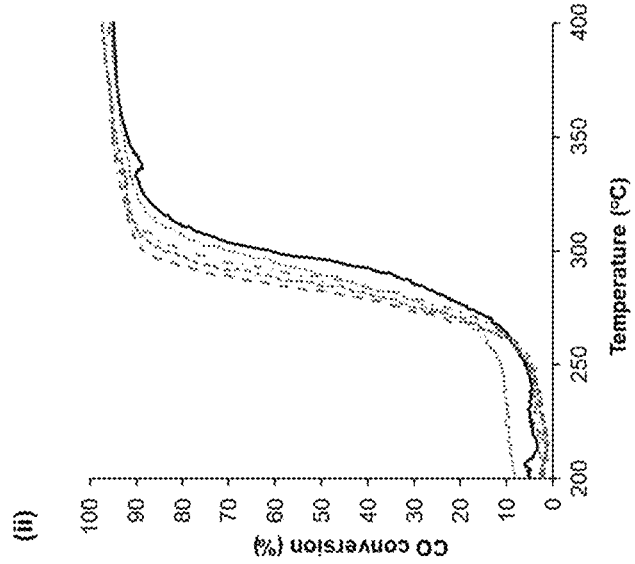
FIG. 5b shows CO conversion results of perturbated light-off performance testing of Reference Example 1 and Examples 1-4.
Figure 5C:
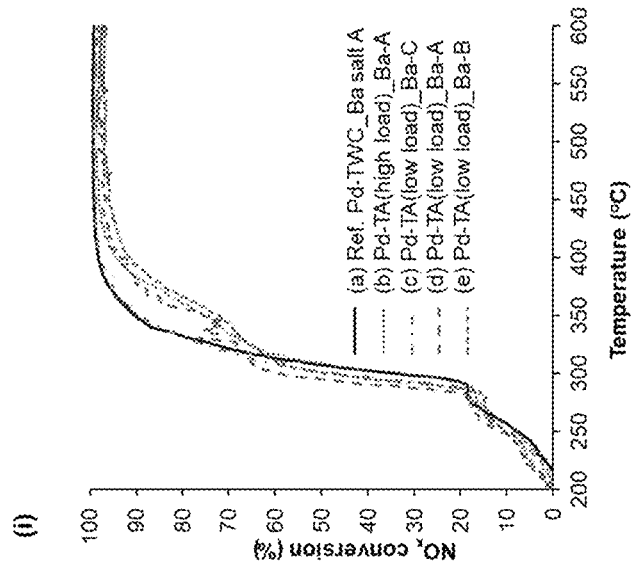
FIG. 5c shows THC conversion results of perturbated light-off performance testing of Reference Example 1 and Examples 1-4.

FIGS. 5a-5c shows the improved light-off performance, especially low-temperature NO$_x$ conversion (FIG. 5a), CO (FIG. 5b) and THC (FIG. 5c) at all temperatures, of TA-modified Pd-TWC catalysts after aging (Aging conditions: 1000° C./Redox/40 hr. Reaction conditions: with rich pretreatment, 150-700° C., A=0.96-1.04, GHSV=200,000 hr$^{-1}$). Compared to (a) Reference Example 1, (b)-(d) Examples 1-3 showed that improved TWC light-off performance can be achieved by (1) optimizing TA loading, and (2) optimizing interaction between Pd and additive, e.g. barium species. Optimization of sequence of addition is also important for performance improvement of TA-modified Pd-TWC The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of manufacturing a catalyst article, the method comprising:
providing a complex of a polyphenol and a PGM, the polyphenol comprising an ester functional group, the PGM comprising palladium;
providing a support material;
applying the complex to the support material to form a loaded support material;
disposing the loaded support material on a substrate; and
heating the loaded support material to form nanoparticles of the PGM on the support material.

2. The method of claim 1, wherein the polyphenol comprises tannic acid.

3. The method of claim 1, wherein the PGM consists of palladium.

4. The method of claim 1, wherein the support material comprises an oxide selected from a group consisting of one or more of Al$_2$O$_3$, SiO$_2$, TiO$_2$, CeO$_2$, ZrO$_2$, CeO$_2$—ZrO$_2$, V$_2$O$_5$, La$_2$O$_3$ and zeolites.

5. The method of claim 1, wherein the support material comprises Al$_2$O$_3$ and CeO$_2$—ZrO$_2$.

6. The method of claim 5, wherein the Al$_2$O$_3$ and/or CeO$_2$—ZrO$_2$ is doped.

7. The method of claim 6, wherein the Al$_2$O$_3$ and/or CeO$_2$—ZrO$_2$ is doped with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, preferably one or more of lanthanum, neodymium and yttrium.

8. The method of claim 1, wherein the loaded support material is disposed on the substrate in the form of a slurry.

9. The method of claim 8, wherein the slurry is prepared by a method comprising:
contacting a PGM salt and a polyphenol in water to form the complex of a polyphenol and a PGM in an aqueous solution, the PGM salt comprising palladium;
applying the complex to the support material to form a loaded support material by contacting the support material with the aqueous solution;
optionally, adding one or more of an oxygen storage material, preferably ceria-zirconia; a promoter salt; a binder; an acid or a base; a thickening agent; and a reducing agent to the aqueous solution.

10. The method of claim 8, wherein the slurry is prepared by a method comprising:
contacting a support material and an aqueous solution of a PGM salt to form a slurry comprising a PGM-salt-loaded support material, the PGM salt comprising palladium;
applying the complex of a polyphenol and a PGM to the support material to form a loaded support material by contacting the slurry comprising the PGM-salt-loaded support material and a polyphenol in water;
optionally, adding one or more of an oxygen storage material, preferably ceria-zirconia; a promoter salt; a binder; an acid or a base; a thickening agent; and a reducing agent to the aqueous solution or the slurry comprising the PGM-salt-loaded support material.

11. The method of claim 8, wherein the support material comprises alumina and ceria-zirconia.

12. The method of claim 8, further comprising disposing a further slurry on the substrate, the further slurry comprising one or more of a further support material; an oxygen storage material; a promoter salt, preferably barium acetate, barium sulfate, barium citrate or a combination thereof; a binder; an acid or a base; a thickening agent; and a reducing agent, wherein disposing the further slurry on the substrate takes place before disposing the support material on the substrate and/or after heating the loaded support material to form nanoparticles of the PGM on the support material.

13. The method of claim 8, wherein disposing the loaded support material on a substrate comprises contacting the slurry with the substrate and optionally:
applying a vacuum to the substrate, and/or
drying the slurry on the substrate.

14. The method of claim 1, wherein the substrate is in the form of a honeycomb monolith, a wall-flow filter or a flow-through filter.

15. The method of claim 1, wherein the heating is carried out:
- at a temperature of from 400° C. to 700° C., preferably from 400° C. to 600° C., more preferably from 450° C. to 600° C.; and/or
- for from 10 to 360 minutes, preferably from 35 to 120 minutes.

* * * * *